United States Patent

Nezu et al.

[11] Patent Number: 5,975,258
[45] Date of Patent: Nov. 2, 1999

[54] DAMPING FORCE CONTROL TYPE HYDRAULIC SHOCK ABSORBER

[75] Inventors: Takashi Nezu, Tokyo; Naoki Makita, Kanagawa-ken, both of Japan

[73] Assignee: Tokico, Ltd, Kanagawa-Ken, Japan

[21] Appl. No.: 08/966,418

[22] Filed: Nov. 7, 1997

[30] Foreign Application Priority Data

Nov. 12, 1996 [JP] Japan .................................. 8-315626

[51] Int. Cl.⁶ ........................................................ F16F 9/34
[52] U.S. Cl. ............................... 188/322.15; 188/266.5; 188/322.22
[58] Field of Search ................................. 188/313, 318, 188/322.13, 282.5, 285.6

[56] References Cited

U.S. PATENT DOCUMENTS

| | | | |
|---|---|---|---|
| 4,646,883 | 3/1987 | Tanaka | 188/282.8 |
| 5,529,154 | 6/1996 | Tanaka | 188/282.6 |
| 5,649,611 | 7/1997 | Nakadata | 188/322.13 |
| 5,655,633 | 8/1997 | Nakadata | 188/266.6 |

*Primary Examiner*—Chris Schwartz
*Attorney, Agent, or Firm*—Wenderoth, Lind & Ponack, L.L.P.

[57] ABSTRACT

A damping force control type hydraulic shock absorber of the present invention includes a cylindrical valve member. One end of the cylinder valve member is closed. Also, the shock absorber includes annular inner and outer seal portions, and a valve seat provided there-between, all of which project from an inner wall of a bottom portion of the valve member and are concentric with one another. A disk valve is secured at an inner peripheral portion thereof to the inner seal portion and abuts at an outer peripheral portion thereof on the valve seat. A retainer disk stacks on the disk valve. An annular seal ring abuts at an inner peripheral portion thereof of an outer peripheral edge portion of the retainer disk, and is secured at an outer peripheral portion thereof to the outer seal portion. A blocking member is connected to an open end of the valve member so that a pilot chamber is formed by the retainer disk, the seal ring and the blocking member.

16 Claims, 4 Drawing Sheets

DAMPING FORCE CONTROL TYPE HYDRAULIC SHOCK ABSORBER

BACKGROUND OF THE INVENTION

The present invention relates to a damping force control type hydraulic shock absorber provided in a suspension system of a vehicle, such as an automobile.

Hydraulic shock absorbers provided in suspension systems of automobiles or other vehicles include damping force control type hydraulic shock absorbers. These shock absorbers can control the damping force level in accordance with road surface conditions, vehicle running conditions, etc. This improves ride quality and steering stability.

In general, a hydraulic shock absorber includes a cylinder in which a hydraulic fluid is sealed. A piston, which has a piston rod connected thereto to constitute a piston assembly, is slidably fitted into the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping mechanism which includes an orifice and a disk valve. The bypass passage is provided with a damping force control valve for controlling opening size of the bypass passage. A reservoir is connected, through a base valve, to one of the chambers in the cylinder to compensate for a volumetric change in the cylinder. The volumetric changes in the cylinder are caused by the extension and retraction of the piston rod by the compression and expansion of a gas sealed in the reservoir.

With the above arrangement, when the bypass passage is opened by the damping force control valve, resistance to the hydraulic fluid flowing between the two chambers in the cylinder is reduced. This reduces a damping force. When the bypass passage is closed, resistance to the hydraulic fluid flowing between the two chambers is increased, and thereby increasing the damping force. Thus, the damping force can be appropriately controlled by opening and closing the damping force control valve.

However, the above-described arrangement creates a problem. Although the damping force can be changed considerably at low piston speeds because the force is dependent on the orifice area of the bypass passage, the damping force cannot be greatly changed at intermediate and high speeds. At these speeds the damping force depends on the damping force generating mechanism in the main hydraulic fluid passage (which includes the disk valve at a predetermined valve opening pressure).

In order to solve the above-mentioned problem, a damping force control type hydraulic shock absorber in which a pressure chamber is formed at the back of a main valve has been proposed. The main valve serves as a damping force generating mechanism in a main hydraulic fluid passage provided in a piston assembly. The pressure chamber communicates with a cylinder chamber which is upstream from the main valve through a fixed orifice. Also, the pressure chamber communicates with a cylinder chamber which is downstream from the main valve through a variable orifice (as disclosed in Japanese Utility Model Application Public Disclosure (KOKAI) No. 62-155242).

In the above-mentioned shock absorber, the opening size of the passage between the two chambers in the cylinder can be controlled by opening and closing the variable orifice. A valve opening pressure of the main valve can be initially changed by changing the pressure in the pressure chamber. Thus, it is possible to control not only orifice characteristics (in which a damping force is approximately proportional to the piston speed squared), but also valve characteristics (in which a damping force is approximately proportional to the piston speed). Thus, it is possible to widen the control range for the damping.

However, in the shock absorber disclosed in KOKAI No. 62-155242, the pressure chamber is formed by slidably fitting the main valve into a valve guide. Hydraulic fluid leaks from the area between the valve guide and the main valve. This makes it difficult to obtain a stable damping force. In particular, leakage from this area is greatly affected by changes in viscosity of hydraulic fluid due to temperature changes. Variations in damping force due to temperature changes can be undesirably large. Further, machining of the sliding portions requires high accuracy which results in higher production costs.

BRIEF SUMMARY OF THE INVENTION

In view of the above discussed problems, the present invention has been made. An object of the present invention is to provide a damping force control type hydraulic shock absorber having a wide control range for damping and capable of maintaining a stable damping force.

According to the present invention, there is provided a damping force control type hydraulic shock absorber comprising:

a cylinder sealably containing a hydraulic fluid;

a piston slidably fitted in the cylinder;

a piston rod connected at one end thereof to the piston, the other end of the piston rod extending to the outside of the cylinder;

a main passage allowing the hydraulic fluid to flow there through in response to a sliding motion of the piston;

a main damping valve having a valve body and provided in the main passage to control an opening size of the main passage;

a pilot chamber provided at a back of the valve body of the main damping valve to apply a pressure in the pilot chamber in a direction for closing the valve body;

an upstream passage for communication between the pilot chamber and a part of the main passage which is upstream from the main damping valve;

a fixed orifice provided in the upstream passage;

a downstream passage for communication between the pilot chamber and a part of the main passage which is downstream from the main damping valve;

a variable orifice provided in the downstream passage to control an opening size of the downstream passage;

a valve member in the shape of a cylinder, one end of which is closed;

concentrically provided annular inner and outer seal portions and a valve seat projecting from an inner wall of a bottom portion of the valve member, the valve seat being provided between the inner seal portion and the outer seal portion;

an inlet hydraulic fluid passage opening between the inner seal portion and the valve seat;

an outlet hydraulic fluid passage opening between the valve seat and the outer seal portion;

a disk valve secured at an inner peripheral portion thereof to the inner seal portion, the disk valve abutting at an outer peripheral portion thereof on the valve seat;

a retainer disk stacked on the disk valve, the retainer disk having a diameter which is smaller than the diameter of the disk valve;

an annular seal ring abutting at an inner peripheral portion thereof on an outer peripheral edge portion of the retainer disk, the seal ring being secured at an outer peripheral portion thereof to the outer seal portion; and a blocking member connected to an opening end of the valve member, wherein the inlet hydraulic fluid passage and the outlet hydraulic fluid passage constitute the main passage, the disk valve constitutes the valve body of the main damping valve and the blocking member, the retainer disk and the seal ring define the pilot chamber.

By virtue of the above described arrangement, the opening size of the passage between the cylinder chambers is directly changed by the opening size of the downstream passage through the variable orifice, and thereby controlling the damping force (orifice characteristics). Moreover, the valve opening characteristics of the main damping valve are changed by changing the pressure in the pilot chamber according to the pressure in the variable orifice, and thereby controlling damping (valve characteristics). Since the pilot chamber is formed without providing a sliding portion, it is possible to minimize leakage of hydraulic fluid from the pilot chamber. Further, since the seal ring abuts the outer peripheral edge portion of the retainer disk, when the seal ring is deflected due to a rise of the pressure in the pilot chamber, there is no substantial change of the diameter of the abutment region between the seal ring and the retainer disk.

The foregoing and other objects, features and advantages of the present invention will be apparent from the following detailed description and appended claims taken in connection with the accompanying drawings.

DETAILED DESCRIPTION OF THE INVENTION

Embodiments of the present invention will be explained below in detail, with reference to the accompanying drawings.

A first embodiment of the present invention will be described with reference to FIGS. 1 to 3. As shown in FIG. 2, in a hydraulic shock absorber body 1, a piston 3 is slidably fitted into a cylinder 2 which contains a hydraulic fluid. The piston 3 divides an inside of the cylinder 2 into two chambers, namely, an upper cylinder chamber 2a and a lower cylinder chamber 2b. One end of a piston rod 4 is connected to the piston 3, and the other end of the piston rod 4 extends through the upper cylinder chamber 2a to the outside of the cylinder 2. A reservoir 6 containing a hydraulic fluid and a gas is connected to the lower cylinder chamber 2b through a base valve 5 provided on a bottom of the cylinder 2.

The piston 3 is provided with a hydraulic fluid passage 7 for providing communication between the upper cylinder chamber 2a and the lower cylinder chamber 2b. A check valve 8 allows the hydraulic fluid to flow through the hydraulic fluid passage 7 only from the lower cylinder chamber 2b the upper cylinder chamber 2a. The base valve 5 is provided with a hydraulic fluid passage 9 for providing communication between the lower cylinder chamber 2b and the reservoir 6. A check valve 10 allows the hydraulic fluid to flow through the hydraulic fluid passage 9 only from the reservoir 6 to the lower cylinder chamber 2b. The hydraulic shock absorber body 1 is connected to a damping force generating mechanism 11 shown in FIGS. 1 and 3.

The damping force generating mechanism 11 is described below with reference to FIGS. 1 and 3. Incidentally, in the damping force generating mechanism 11, a valve mechanism for an extension stroke and a valve mechanism for a compression stroke are substantially the same. Therefore, an enlarged view of a valve mechanism common to both strokes (shown in FIG. 3) will be described.

Figure 1:
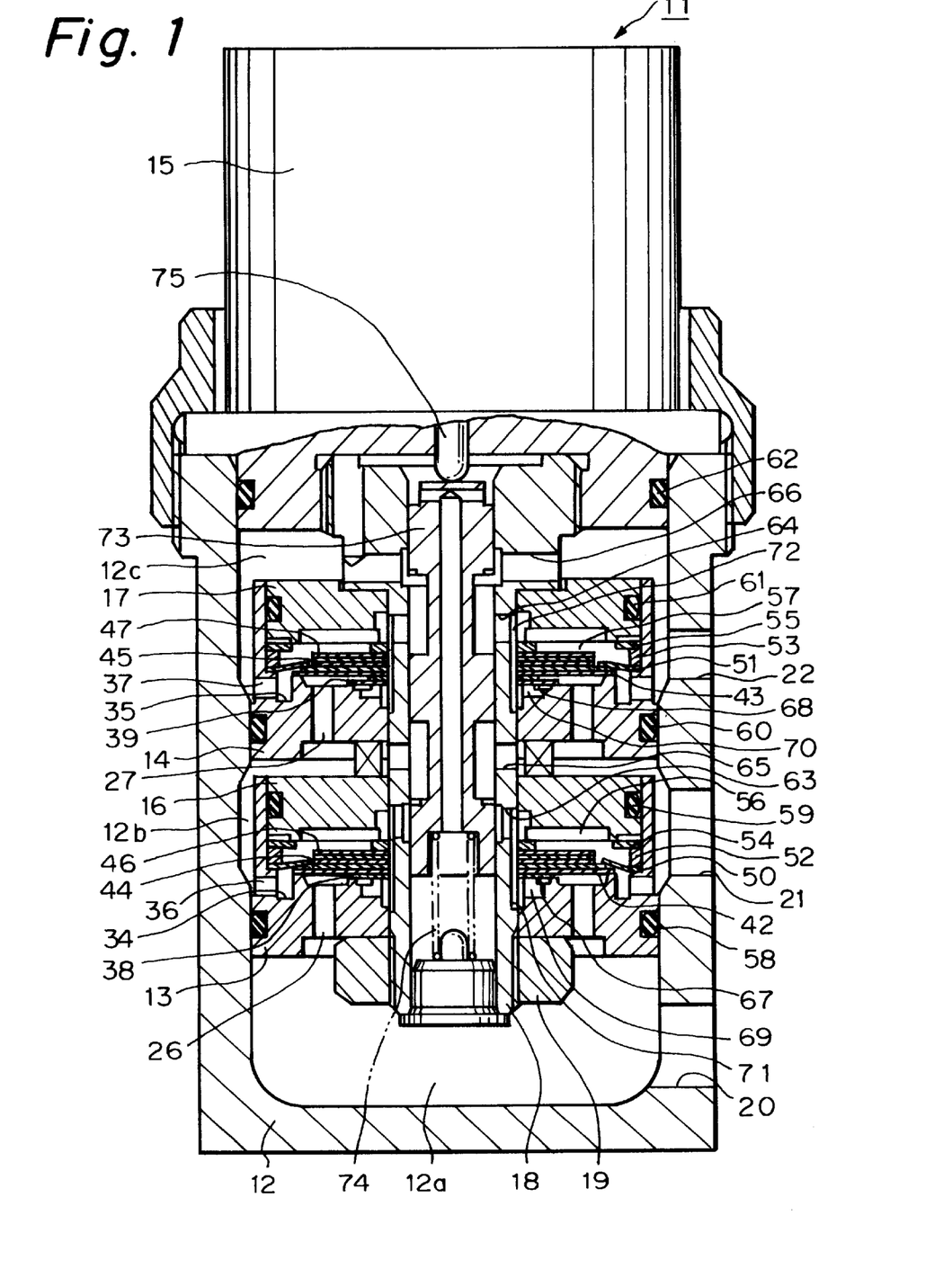
FIG. 1 is a vertical sectional view of a damping force generating mechanism in a damping control type hydraulic shock absorber according to a first embodiment of the present invention.
Figure 2:
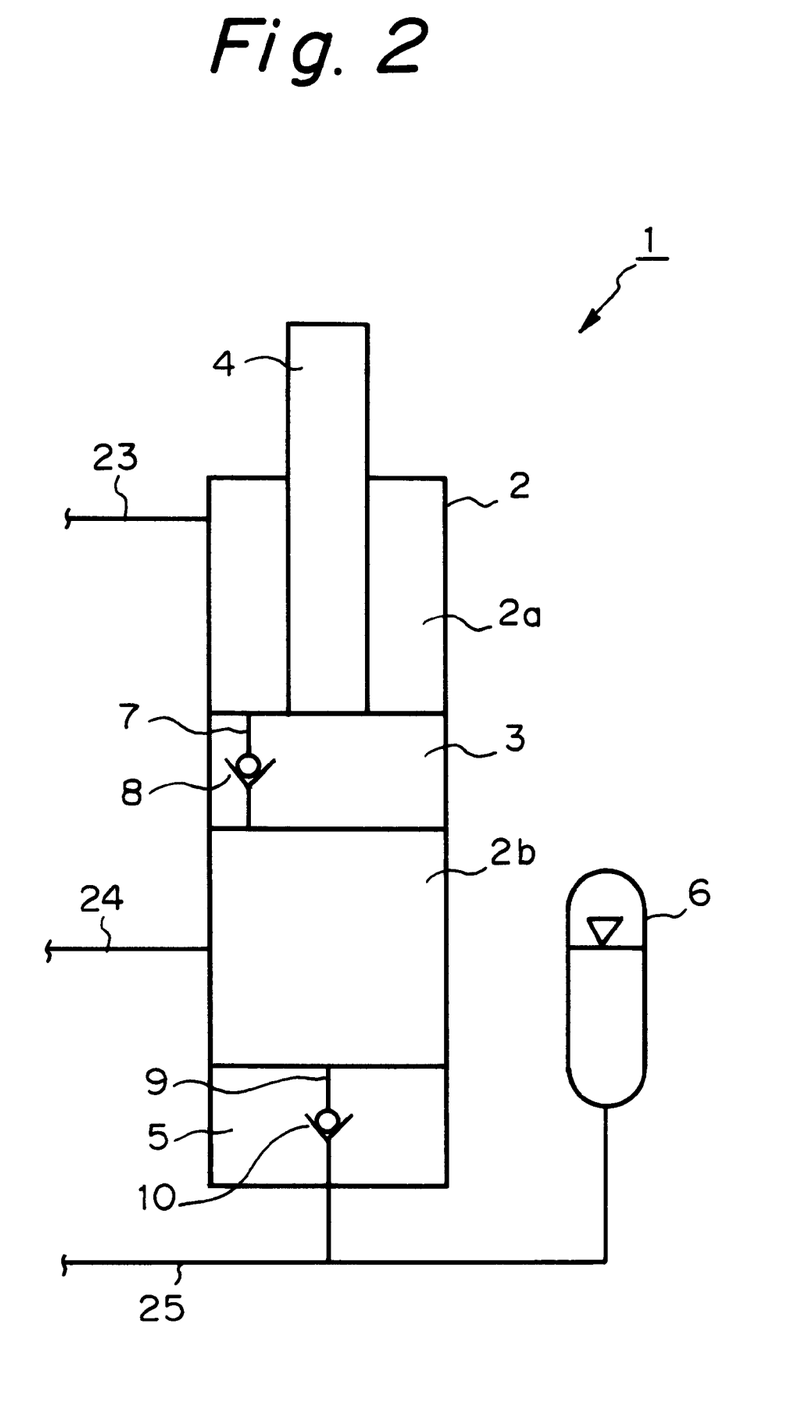
FIG. 2 is an illustration of a hydraulic shock absorber body in the shock absorber according to the first embodiment of the present invention.
Figure 3:
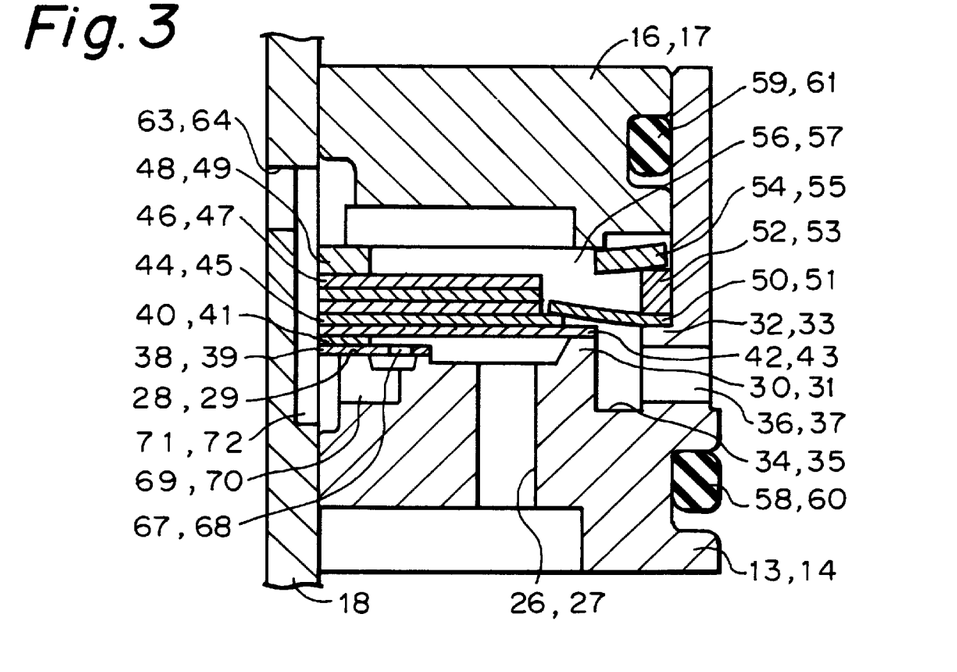
FIG. 3 is an enlarged view of a valve mechanism used in the damping force generating mechanism shown in FIG. 1.

As shown in FIGS. 1 and 3, the damping force generating mechanism 11 has a casing 12 which is shaped like cylinder with one closed end. Two valve members 13 and 14 are fitted into the casing 12. The valve members 13 and 14 each have a cylindrical shape with one closed end. A proportional solenoid actuator 15 (hereinafter, referred to simply as "actuator 15") is secured to an open end of the casing 12. The inside of the casing 12 is divided into three hydraulic fluid chambers 12a, 12b and 12c by the valve members 13 and 14. Annular blocking members 16 and 17 are fitted in the open ends of the valve members 13 and 14, respectively. A cylindrical guide member 18, which is secured to the actuator 15 by a threaded engagement, is inserted through the valve members 13 and 14, and the blocking members 16 and 17. The cylindrical guide member 18 is secured with a nut 19. A side wall of the casing 12 is provided with connecting holes 20, 21 and 22 which communicate with the hydraulic fluid chambers 12a, 12b and 12c, respectively. The connecting holes 20, 21 and 22 are connected to hydraulic fluid passages 23, 24 and 25 respectively (see FIG. 2). The hydraulic fluid passages 23, 24 and 25 are connected to the upper cylinder chamber 2a, the lower cylinder chamber 2b and the reservoir 6 of the hydraulic shock absorber body 1, respectively.

Bottom portions of the valve members 13 and 14 are provided with a plurality (only two of them are shown for each bottom portion) of axially extending hydraulic fluid passages 26 and 27 (hydraulic fluid inlet passages), respectively. Annular inner seal portions 28 and 29 (see FIG. 3), respectively, project from inner walls of the bottom portions of the valve members 13 and 14 at positions radially inside of the hydraulic fluid passages 26 and 27. Annular valve seats 30 and 31 (see FIG. 3) project from the inner walls of the bottom portions of the valve members 13 and 14 at positions radially outside of the hydraulic fluid passages 26 and 27. Further, annular outer seal portions 32 and 33 (see FIG. 3) project from the inner walls of the bottom portions of the valve members 13 and 14 at positions radially outside of the valve seats 30 and 31, and near the side walls of the valve members 13 and 14. Annular grooves 34 and 35 are formed, respectively, between the valve seats 30 and 31, and the outer seal portions 32 and 33. The grooves 34 and 35 are connected to the hydraulic fluid chambers 12b and 12c through hydraulic fluid passages 36 and 37 (outlet hydraulic fluid passages), respectively. The hydraulic fluid passages 26 and 27, and the hydraulic fluid passages 36 and 37 constitute a main passage.

As shown in FIG. 3, circular orifice plates 38 and 39 (explained later in detail) and spacers 40 and 41 are stacked on the inner seal portions 28 and 29 of the valve members 13 and 14, respectively. Further, disk valves 42 and 43 (valve bodies of a main damping valve) are stacked on the spacers 40 and 41. Circular retainer disks 44 and 45, which have a slightly smaller outer diameter as compared to the disk valves 42 and 43, are stacked on the disk valves 42 and 43, respectively. A plurality (three in this embodiment) of plate springs 46 and 47 (spring means), and spacers 48 and 49 are stacked on the retainer disks 44 and 45, respectively. The plate springs 46 and 47 each have a circular plate shape and have a smaller outer diameter than the retainer disks 44 and 45. The disk valves 42 and 43 abut at their respective outer peripheral portions thereof on the valve seats 30 and 31.

Flexible seal rings 50 and 51 are fitted in the valve members 13 and 14, respectively. The seal rings 50 and 51 abut with a small overlap, at their respective inner peripheral portions thereof, outer peripheral portions of the retainer disks 44 and 45. The seal rings 50 and 51 abut, at their respective outer peripheral portions thereof, on the outer seal portions 32 and 33. Retainer rings 52 and 53 abut on respective outer peripheral portions of the seal rings 50 and 51. Annular seal plates 54 and 55 abut, at their respective outer peripheral portions thereof, on the retainer rings 52 and 53. Further, the blocking members 16 and 17, fitted in the valve members 13 and 14, abut on the spacer 48 and 49. The blocking members 16 and 17 abut inner peripheral portions of the seal plates 54 and 55. Thus, inner peripheral portions of the disk valves 42 and 43 are secured. The retainer disks 44 and 45, and the plate springs 46 and 47 are secured to the inner seal portions 28 and 29. The outer peripheral portions of the seal rings 50 and 51 are secured to the outer seal portions 32 and 33.

The blocking members 16 and 17, the retainer disks 44 and 45, and the seal rings 50 and 51 define pilot chambers 56 and 57. Spaces between the valve members 13 and 14 and the blocking members 16 and 17 are sealed by the retainer rings 52 and 53, and the seal plates 54 and 55. In order to achieve secure sealing of the abutting portions of the retainer disks 44 and 45 and the seal rings 50 and 51, the outer peripheral portions of the seal rings 50 and 51 are pressed against the bottom portions of the valve members 13 and 14 at locations lower than the inner peripheral portions of the seal rings 50 and 51. The seal rings 50 and 51 press against the retainer disks 44 and 45. In FIG. 3, reference numerals 58, 59, 60, 61, and 62 denote O-rings.

A side wall of the guide member 18 is provided with ports 63 and 64 which communicate with pilot chambers 56 and 57, respectively. Ports 65 and 66 (see FIG. 1) communicate with the hydraulic fluid chambers 12b and 12c, respectively. The orifice plates 38 and 39, attached to the inner seal portions 28 and 29, have fixed orifices 67 and 68. The fixed orifices 67 and 68, cut portions 69 and 70, and grooves 71 and 72 formed at an outer peripheral portion of the guide member 18 constitute upstream passages. The hydraulic fluid passages 26 and 27 communicate with the ports 63 and 64, and the pilot chambers 56 and 57 through these upstream passages. Further, a spool 73 (see FIG. 1) is slidably fitted in the guide member 18 to control the respective opening sizes of a passage (a downstream passage) between the ports 63 and 65, and a passage (a downstream passage) between the ports 64 and 66. The spool 73 is biased towards the actuator 15 by a compression spring 74. The opening sizes of the ports 63 and 66 (variable orifices) are controlled by moving the spool 73 by an actuating rod 75 of the actuator 15 against the biasing force of the compression spring 74.

The operation of the hydraulic shock absorber according to the first embodiment of the present invention will be described below.

During the extension stroke of the piston rod 4, the check valve 8 is closed. The hydraulic fluid in the upper cylinder chamber 2a is pressurized. Consequently, the hydraulic fluid flows toward the lower cylinder chamber 2b through the damping force generating mechanism 11. The hydraulic fluid passage 23 is connected to the connecting hole 20. The hydraulic fluid from the upper cylinder chamber 2a flows through the hydraulic fluid chamber 12a, the hydraulic fluid passage 26, and the fixed orifice 67. The hydraulic fluid then flows through the cut portion 69, the groove 71, and the port 63. Then the hydraulic fluid flows through the port 65, the hydraulic fluid chamber 12b, and out the connecting hole 21 to the hydraulic fluid passage 24. The hydraulic fluid from the upper cylinder chamber 2a finally flows from the hydraulic fluid passage 24 into the lower cylinder chamber 2b. When the pressure in the cylinder upper chamber 2a reaches a valve opening pressure for the disk valve 42, the disk valve 42 opens. The hydraulic fluid flows directly from the hydraulic fluid passage 26 to the hydraulic fluid chamber 12b through the groove 34 and the hydraulic fluid passage 36. On the other hand, a volume of hydraulic fluid corresponding to an amount by which the piston rod 4 withdraws from the cylinder 2 flows from the reservoir 6 into the lower cylinder chamber 2b. The check valve 10 opens the hydraulic fluid passage 9 in the base valve 5.

Accordingly, during the extension stroke, when the piston speed is low before the disk valve 42 opens, a damping force is generated according to the opening size of the fixed orifice 67 and the opening size of the port 63. The opening size of port 63 is controlled by the movement of the spool 73. As the piston speed increases, the pressure in the upper cylinder chamber 2a increases, and eventually the disk valve 42 opens. After the disk valve 42 opens, a damping force is generated according to the size of the opening at the disk valve 42. Thus, an increase in damping force due to an increase in the piston speed can be controlled.

In this case, as the opening size of the port 63 is reduced by moving the spool 73, the pressure due to the port 63 increases, and the pressure in the pilot chamber 56, which is upstream from the port 63, becomes higher. The valve opening pressure of the disk valve 42 becomes higher. Consequently, the pressure in the pilot chamber 56 is applied to close the disk valve 42. The movement of the spool 73 can be controlled by applying an electrical current to the actuator 15. Thus, when the opening size of the port 63 is changed through movement of the spool 73 not only can orifice characteristics (such as opening size) be directly controlled, but also valve characteristics can be controlled due to changes in pressure in the pilot chamber 56. Therefore, the damping force can be controlled over a wide piston speed range.

During the compression stroke, the check valve 8 opens so that the pressures in the cylinder upper chamber 2a and the cylinder lower chamber 2b become substantially the same. No hydraulic fluid flows between the connecting holes 20 and 21 of the damping force generating mechanism 11.

On the other hand, the check valve 10 is closed during the compression stroke. The hydraulic fluid pressure in the cylinder 2 corresponds to an amount by which the piston rod 4 moves in the cylinder 2. Consequently, the hydraulic fluid flows from the cylinder lower chamber 2b through the damping force generating mechanism to the reservoir 6. This is accomplished by the hydraulic fluid flowing through the hydraulic fluid passage 24, the connecting hole 21, and the hydraulic fluid chamber 12b. Then, the hydraulic fluid flows through the hydraulic fluid passage 27, the fixed orifice 68, the cut portion 70, and the groove 72. The hydraulic fluid then flows through the port 64, the port 66, the hydraulic fluid chamber 12c, the connecting hole 22 and the hydraulic fluid passage 25 to the reservoir 6. When the pressure in the cylinder 2 reaches the valve opening pressure for the disk valve 43, the disk valve opens. The hydraulic fluid flows directly from the hydraulic fluid passage 27 to the hydraulic fluid chamber 12c through the groove 35 and the hydraulic fluid passage 37.

Accordingly, during the compression stroke, when the piston speed is low before the disk valve 43 opens, a damping force is generated according to the opening size of the port 66 which is determined by the movement of the spool 73. As the piston speed increases, the pressure in the cylinder 2 rises, and eventually the disk valve 43 opens. After the disk valve 43 has opened, a damping force is generated according to the degree at which the disk valve 43 opens (valve characteristics). Thus, an increase in damping force due to an increase in piston speed can be controlled.

During the compression stroke, as in the case of the extension stroke, as the opening size of the port 66 is reduced by moving the spool 73, the pressure due to the port 66 increases, and the pressure in the pilot chamber 57 becomes higher. Consequently, the higher pressure in the pilot chamber 57 closes the disk valve 43. Therefore, the valve opening pressure for the disk valve 43 becomes higher. Thus, when the opening size of the port 66 is changed through movement of the spool 73, not only can the orifice characteristics be directly controlled but also the valve characteristics can be controlled due to changes in pressure in the pilot chamber 57. Therefore, the damping force can be controlled over a wide range of piston speeds. The damping force can be controlled for each of the extension and compression strokes by arranging the ports 63 and 66 so that the opening size of each of the ports 63 and 66 is changed by the movement of the spool 73. For example, the ports 63 and 66, and the spool 73 can be arranged so that the opening sizes of the ports 63 and 66 change according to the position of the spool 73. During the extension and compression strokes the opening size of one of the ports 63 and 66 can be large and the opening size of the other can be small. It is possible to select a combination of different damping characteristics for the extension and compression strokes (e.g., a combination of "hard" characteristics for the extension stroke and "soft" characteristics for the compression stroke, and vice versa.)

Further, since the pilot chambers 56 and 57 are formed without a sliding portion, it is possible to minimize the leakage of hydraulic fluid from the pilot chambers 56 and 57, and hence it is possible to obtain stable damping characteristics. Moreover, it is possible to minimize variations in damping force due to temperature changes. Further, differing from the prior art technique disclosed in the above-mentioned KOKAI No. 62-155242, there is no need to machine a sliding portion, which requires high accuracy. Thus, production costs can be lower. Further, since the inner seal portions 28 and 29, the valve seats 30 and 31, and the outer seal portions 32 and 33 can be integrally formed within the valve members 13 and 14 by a metal-sintering process or the like, it is possible to improve the height tolerances of these portions. Thus, it is possible to minimize variations in the valve opening pressures for the disk valves 46 and 47.

The retainer rings 44 and 45 are provided between the disk valves 42 and 43, and the seal rings 50 and 51. With respect to the abutting portions of the seal rings 50 and 51, and the retainer rings 44 and 45, the overlap is sufficiently small so as to minimize changes in the diameter of an abutment region between the seal rings 50 and 51, and the retainer rings 44 and 45. The overlap is sufficiently small even when the seal rings 50 and 51 are deflected towards the bottom portions of the valve members 13 and 14 due to a pressure increase in the pilot chambers 56 and 57. The contact angles between the seal rings 50 and 51, and the retainer rings 44 and 45 reduce as the disk valves 42 and 43 open (lift). As a result, for "hard" damping characteristics and at high piston speeds, it is possible to suppress sharp increases in the valve opening pressures of the disk valves 42 and 43 due to pressure increases in the pilot chambers 56 and 57. This allows for the creation of a stable damping force. Further, since the overlap between the seal rings 50 and 51, and the retainer rings 44 and 45 is sufficiently small, friction between the seal rings 50 and 51 and the retainer rings 44 and 45 can be suppressed. Thus, variations in damping force due to friction is suppressed.

Further, the retainer rings 44 and 45 are circular and hence capable of being readily machined with a desired tolerance and high strength. Therefore, the retainer rings 44 and 45 can be produced at low cost and are highly durable.

In the present invention, the spaces between the valve members 13 and 14, and the blocking members 16 and 17 are not sealed by the O-rings 59 and 61, which are made of rubber with high elasticity. However, the blocking members 16 and 17 are sealed by the seal plates 54 and 55 which have small elasticity. Therefore, it is possible to suppress the elastic deformation of the pilot chambers 56 and 57. This improves responsiveness in the control of the damping force. The seal plates used in this embodiment are metallic which are capable of functioning as a spring. However, the material used for the seal plate is not limited to metals. Various materials, such as plastics, can be used so long as they can seal and not elasticly deform as large as rubber.

Next, a second embodiment of the present invention is explained with reference to FIG. 4. The arrangement of the second embodiment of the present invention is substantially the same as that of the first embodiment of the present invention, except that the valve members 13,14 and the blocking members 16,17 in the damping force generating mechanism 11 are changed. Therefore, in FIG. 4, the same members or portions as those in the first embodiment are denoted by the same reference materials, and only portions in which the second embodiment differ from the first embodiment will be described in detail. As in the case of FIG. 3, the second embodiment in FIG. 4 has common valve mechanisms for both the extension and compression strokes.

Figure 4:
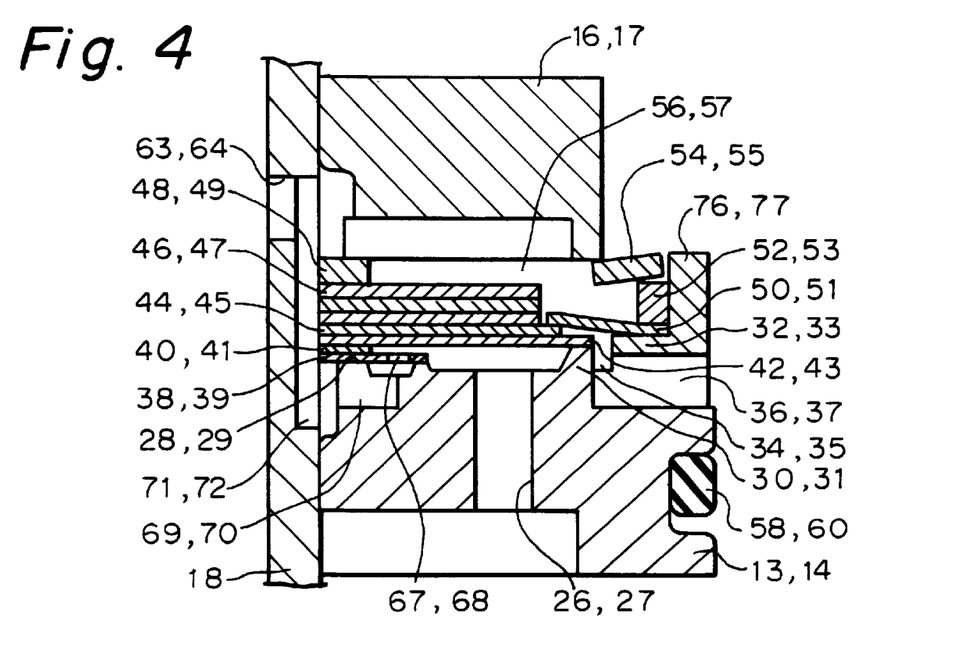
FIG. 4 is an enlarged view of a valve mechanism used in a damping force generating mechanism in a damping control type hydraulic shock absorber according to a second embodiment of the present invention.

In the damping force generating mechanism 11 according to the second embodiment of the present invention, as shown in FIG. 4, cylindrical side wall members 76 and 77 are separate from the valve members 13 and 14. End portions of the side wall members 76 and 77 are fitted around the valve seats 30 and 31, respectively. The respective end portions of the side wall members 76 and 77 have stepped portions formed inside which are concentric with the side wall members 76 and 77. These stepped portions form the grooves 34 and 35, and the outer seal portions 32 and 33. The sidewall portions also have cut portions which form the hydraulic fluid passages 36 and 37 for communication between the grooves 34 and 35, and the hydraulic fluid chambers 12b and 12c. The axial lengths of the side wall members 76 and 77 and the outer diameters of the blocking members 16 and 17 are smaller than those in the first embodiment. The O-rings 59 and 61 are not employed. The spaces between the side wall members 76 and 77, and the blocking members 16 and 17 are sealed by the retainer rings 52 and 53, and the seal plates 54 and 55.

The above-mentioned arrangement in the second embodiment of the present invention provides the same function and advantageous effects as those in the first embodiment of the present invention. Moreover, in the second embodiment, the side wall members 76 and 77 can be easily formed by a metal-sintering process or the like. Machining the grooves 34 and 35, and the hydraulic fluid passages 36 and 37 in the valve members 13 and 14 is not necessary, which improves productivity. Further, the widths of the grooves 34 and 35 can be reduced because no relief portions for drilling the hydraulic fluid passages 36 and 37 in the in the valve members 13 and 14 are required. Thus, the valve members 13 and 14 can be compactly made.

Next, a third embodiment of the present invention is explained with reference to FIG. 5. The arrangement of the third embodiment of the present invention is substantially the same as that of the first embodiment of the present invention, except that spacers 78 and 79 are provided between the outer seal portions 32 and 33, and the seal rings 50 and 51 in the valve members 13 and 14 in the damping force generating mechanism 11. Therefore, in FIG. 5, the same members or portions as those in the first embodiment are denoted by the same reference numerals, and only portions in which the third embodiment differs from the first embodiment will be described in detail. As in the case of FIG. 3, FIG. 5 operates similarly for the extension and compression strokes.

Figure 5:
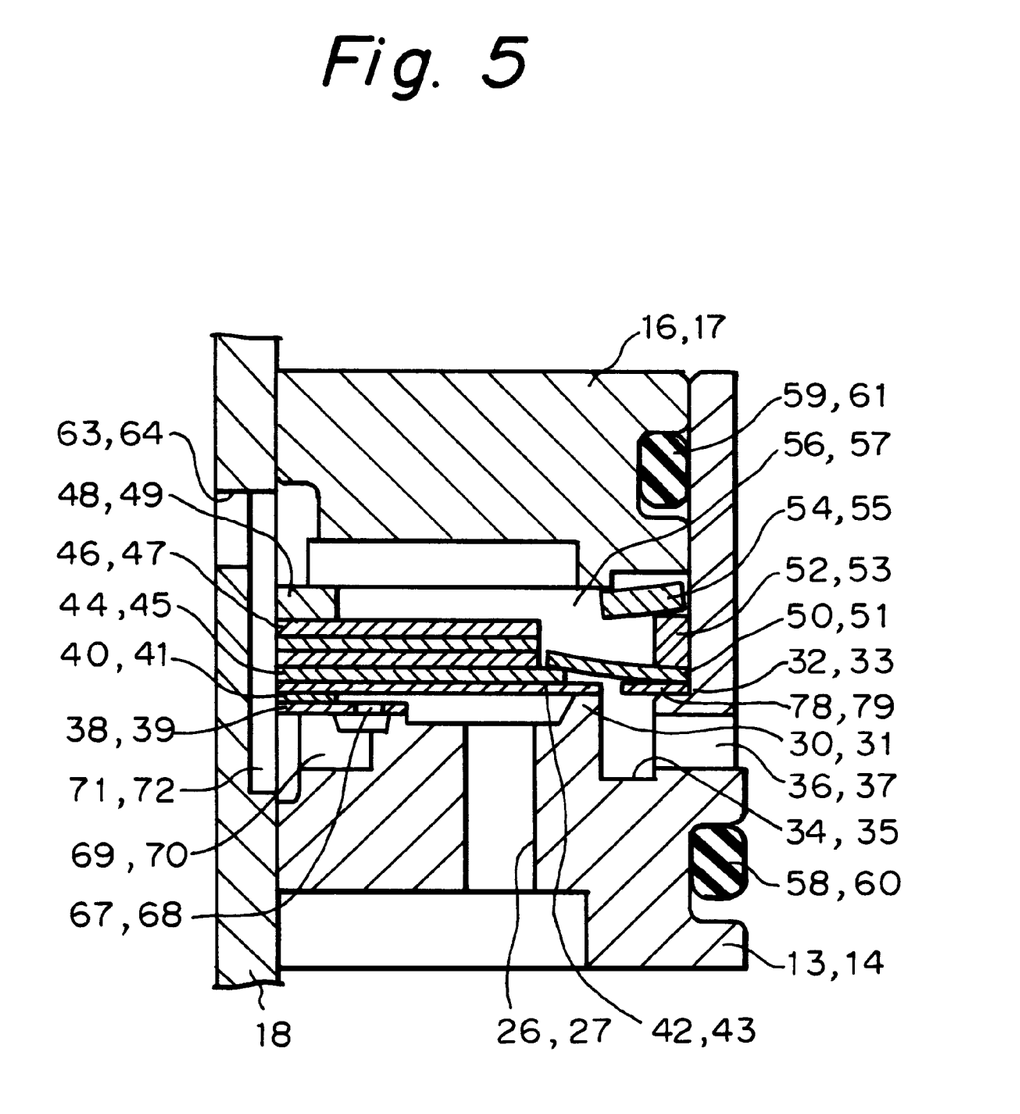
FIG. 5 is an enlarged view of a valve mechanism used in a damping force generating mechanism in a damping control type hydraulic shock absorber according to a third embodiment of the present invention.

As shown in FIG. 5, in the third embodiment of the present invention, annular spacers 78 and 79 are, respectively, provided between the outer seal portions 32 and 33, and the seal rings 50 and 51. The spacers 78 and 79 have an inner diameter which is smaller than those of the outer seal portions 32 and 33, and have an inner peripheral portion projecting from the outer seal portions 32 and 33. When the seal rings 50 and 51 are deflected towards the bottom portions of the valve members 13 and 14, spacers 78 and 79 restrict the deflection of the seal rings 50 and 51.

The above-mentioned arrangement in the third embodiment of the present invention provides the same function and advantages as those in the first embodiment of the present invention. Moreover, in the third embodiment, when the seal rings 50 and 51 are deflected toward the valve members 13 and 14 by pressure in the pilot chambers 56 and 57, spacers 78 and 79 restrict the deflection of the seal rings 50 and 51. In this case, as the deflection of the seal rings 50 and 51 due to the pressures (pilot pressures) in the pilot chambers 56 and 57 becomes large, the abutment region between the seal rings 50 and 51 and the spacers 78 and 79 support the seal rings 50 and 51 against the pilot pressures. The pilot pressures applied to the disk valves 42 and 43 become smaller, and thereby suppress an increase in the valve opening pressure for the disk valves 42 and 43. Consequently, for "hard" damping in which the pilot pressure becomes large, excessive damping forces at high piston speeds due to an uneven road surface can be suppressed. Thus, this prevents a reduction in ride quality.

Further, since the seal rings 50 and 51 are supported by the spacers 78 and 79, the seal rings 50 and 51 having less rigidity can be employed. Therefore, the valve opening pressures for the disk valves 42 and 43 can be set to low values, and thereby increase the range of settings for damping.

Incidentally, the spacers 78 and 79 in the third embodiment may be applied to the second embodiment shown in FIG. 4. Further, the spacers 78 and 79 are not limited to annular projecting members as used in the third embodiment. The spacers 78 and 79 may be integrally formed with the valve members 13 and 14.

As mentioned above, in the damping force control type hydraulic shock absorber of the present invention, the opening sizes of the passages between the cylinder chambers are directly changed by the opening sizes of the downstream passages through the use of variable orifices and thereby control damping (orifice characteristics). Moreover, the valve opening characteristics of the main damping valve are changed by changing the pressure in the pilot chamber 56, 57 according to the pressure in the variable orifices and, thereby, control damping (valve characteristics). Therefore, it is possible to widen the damping control range. Further, since the pilot chamber 56, 57 is formed without a sliding portion, it is possible to minimize the leakage of hydraulic fluid from the pilot chamber 56, 57, and thereby obtain stable damping. Further, since the seal ring 50, 51 abuts the outer peripheral edge portion of the retainer disk 44, 45, when the seal ring 50, 51 is deflected due to a rise in the pressure in the pilot chamber 56, 57, there is substantially no change with respect to the diameter of the abutment region between the seal ring 50, 51, and the retainer disk 44, 45. As a result, for "hard" damping characteristics and at high piston speeds, it is possible to suppress sharp increases in the valve opening pressure of the disk valve 42, 43 due to a rise of the pressure in the pilot chamber 56, 57. This creates stable damping.

The arrangement shown in FIG. 4 is especially advantageous in that it is easy to form the valve member 13, 14 by a sintering process or the like. Further, in the arrangement of FIG. 4, the pilot chamber 56, 57 is not sealed by an O-ring which is made of rubber with large elasticity. Rather, the pilot chamber 56, 57 is sealed by the seal plate with a small elasticity, so that elastic deformation of the pilot chamber 56, 57 can be suppressed, and thereby improve the responsivity for damping.

Further, in the arrangement shown in FIG. 5, when the seal ring 50, 51 is deflected by the pressure in the pilot chamber 56, 57, the seal ring 50, 51 abuts the spacer 78, 79 so that the deflection of the seal ring can be restricted. As the seal ring deflects due to increasing pressure in the pilot chamber, the abutment region between the seal ring 50, 51 and the spacer 78, 79 enlarges radially inward so that the spacer 78, 79 supports the seal ring 50, 51 against the pressure. The pressure applied to the disk valve 42, 43 becomes smaller, and thereby suppresses sharp increases in the valve opening pressure for the disk valve 42, 43. Consequently, for "hard" damping in which the pressure in the pilot chamber 56, 57 becomes large, excessive increases in damping force at high piston speeds due to uneven road surfaces can be suppressed. Thus, the ride quality is improved.

In each of the embodiments described above, separate extension side and compression side damping valve mechanisms are provided so that extension-side damping force and compression-side damping force can differ in their magnitude and characteristics at the same time. However, the invention is not limited to this feature. This invention is also applicable to hydraulic shock absorbers which are so called "unidirectional flow" types (or circulation type) in which hydraulic fluid flows through a common passage in both extension and compression strokes. Damping force is created by a common (single) valve mechanism (in this type, it is not possible to simultaneously select damping forces for extension and compression strokes which have different characteristics.

What is claimed is:

1. A damping force control type hydraulic shock absorber which uses a hydraulic fluid, comprising:

a cylinder to sealably contain the hydraulic fluid;

a piston slidably fitted in said cylinder;

a piston rod connected at one end thereof to said piston, another end of said piston rod extending outside said cylinder;

a main passage for allowing the hydraulic fluid to flow therethrough in response to a sliding motion of said piston;

a main damping valve having a valve body and provided in said main passage to control an opening size of said main passage;

a pilot chamber provided at a back of said valve body of said main damping valve to apply a pressure in said pilot chamber in a direction for closing said valve body;

an upstream passage for communication between said pilot chamber and a part of said main passage which is upstream from said main damping valve;

a fixed orifice provided in said upstream passage;

a downstream passage for communication between said pilot chamber and a part of said main passage which is downstream from said main damping valve;

a variable orifice provided in said downstream passage to control an opening size of said downstream passage;

a valve member in a shape of a cylinder, one end of which is closed, and said valve member including an open end and a bottom portion with an inner wall;

an annular inner seal portion projecting from said inner wall of said bottom portion of said valve member;

an annular outer seal portion projecting from said inner wall of said bottom portion of said valve member;

a valve seat projecting from said inner wall of said bottom portion of said valve member between said inner seal portion and said outer seal portion, said inner and outer seal portions and said valve seat being concentric with one another;

an inlet hydraulic fluid passage opening between said inner seal portion and said valve seat;

an outlet hydraulic fluid passage opening between said valve seat and said outer seal portion;

a disk valve secured at an inner peripheral portion thereof to said inner seal portion, said disk valve abutting at an outer peripheral portion thereof on said valve seat;

a retainer disk stacked on said disk valve, said retainer disk having an outer diameter which is smaller than an outer diameter of said disk valve;

an annular seal ring abutting at an inner peripheral portion thereof on an outer peripheral edge portion of said retainer disk, said seal ring being secured at an outer peripheral portion thereof to said outer seal portion;

a blocking member connected to said open end of said valve member; and wherein said inlet hydraulic fluid passage and said outlet hydraulic fluid passage constitute said main passage, said disk valve constitutes said valve body of said main damping valve, and said blocking member, said retainer disk and said seal ring define said pilot chamber.

2. A damping force control type hydraulic shock absorber according to claim 1, wherein a side wall of said valve member is provided separately from said bottom portion of said valve member, and said pilot chamber is defined so that a retainer ring provided on said seal ring abuts on an outer peripheral portion of an annular seal plate abutting on said blocking member.

3. A damping force control type hydraulic shock absorber according to claim 2, further comprising a projecting member is provided between said outer seal portion and said seal ring, said projecting member projecting radially inward from said outer seal portion and having an inner diameter which is smaller than an inner diameter of said outer seal portion.

4. A damping force control type hydraulic shock absorber according to claim 2, wherein each of said bottom portion and said side wall of said valve member is made of a sintered metal.

5. A damping force control type hydraulic shock absorber according to claim 1, further comprising a projecting member is provided between said outer seal portion and said seal ring, said projecting member projecting radially inward from said outer seal portion and having an inner diameter which is smaller than an inner diameter of said outer seal portion.

6. A damping force control type hydraulic shock absorber according to claim 5, wherein said projecting member comprises an annular plate.

7. A damping force control type hydraulic shock absorber according to claim 1, further comprising a spring pressing said retainer disk and said disk valve against said valve seat.

8. A damping force control type hydraulic shock absorber according to claim 1, wherein said valve member is made of a sintered metal.

9. A damping force generating mechanism which uses a hydraulic fluid, comprising:

a main passage for allowing the hydraulic fluid to flow therethrough;

a main damping valve having a valve body and provided in said main passage to control an opening size of said main passage;

a pilot chamber provided at a back of said valve body of said main damping valve to apply a pressure in said pilot chamber in a direction for closing said valve body;

an upstream passage for communication between said pilot chamber and a part of said main passage which is upstream from said main damping valve;

a fixed orifice provided in said upstream passage;

a downstream passage for communication between said pilot chamber and a part of said main passage which is downstream from said main damping valve;

a variable orifice provided in said downstream passage to control an opening size of said downstream passage;

a valve member in a shape of a cylinder, one end of which is closed, and said valve member including an open end and a bottom portion with an inner wall;

an annular inner seal portion projecting from said inner wall of said bottom portion of said valve member;

an annular outer seal portion projecting from said inner wall of said bottom portion of said valve member;

a valve seat projecting from said inner wall of said bottom portion of said valve member between said inner seal portion and said outer seal portion, said inner and outer seal portions and said valve seat being concentric with one another;

an inlet hydraulic fluid passage opening between said inner seal portion and said valve seat;

an outlet hydraulic fluid passage opening between said valve seat and said outer seal portion;

a disk valve secured at an inner peripheral portion thereof to said inner seal portion, said disk valve abutting at an outer peripheral portion thereof on said valve seat;

a retainer disk stacked on said disk valve, said retainer disk having an outer diameter which is smaller than an outer diameter of said disk valve;

an annular seal ring abutting at an inner peripheral portion thereof on an outer peripheral edge portion of said retainer disk, said seal ring being secured at an outer peripheral portion thereof to said outer seal portion;

a blocking member connected to said open end of said valve member; and wherein said inlet hydraulic fluid passage and said outlet hydraulic fluid passage constitute said main passage, said disk valve constitutes said valve body of said main damping valve, and said blocking member, said retainer disk and said seal ring define said pilot chamber.

10. A damping force generating mechanism according to claim 9, wherein a side wall of said valve member is provided separately from said bottom portion of said valve member, and said pilot chamber is defined so that a retainer ring provided on said seal ring abuts on an outer peripheral portion of an annular seal plate abutting on said blocking member.

11. A damping force generating mechanism according to claim 10, further comprising a projecting member is provided between said outer seal portion and said seal ring, said projecting member projecting radially inward from said outer seal portion and having an inner diameter which is smaller than an inner diameter of said outer seal portion.

12. A damping force generating mechanism according to claim 10, wherein each of said bottom portion and said side wall of said valve member is made of a sintered metal.

13. A damping force generating mechanism according to claim 9, further comprising a projecting member is provided between said outer seal portion and said seal ring, said projecting member projecting radially inward from said outer seal portion and having an inner diameter which is smaller than an inner diameter of said outer seal portion.

14. A damping force generating mechanism according to claim 13, wherein said projecting member comprises an annular plate.

15. A damping force generating mechanism according to claim 9, further comprising a spring pressing said retainer disk and said disk valve against said valve seat.

16. A damping force generating mechanism according to claim 9, wherein said valve member is made of a sintered metal.

* * * * *